Patented Mar. 17, 1942

2,277,005

UNITED STATES PATENT OFFICE 2,277,005

VITREOUS ENAMELING

Carl R. Ruse, Toledo, Ohio, assignor to Plastic Lights, Inc., Toledo, Ohio, a corporation of Ohio No Drawing. Application July 13, 1939, Serial No. 286,017

3 Claims. (Cl. 91—72)

This invention relates to vitreous enamel coating, and more particularly the enameling of fragile articles and articles of irregular shape; and it is among the objects of the invention to make provision for enameling such as to treat articles which are inherently over-susceptible to damage in enameling heat. A further object is the provision of selective enameling whereby different portions of articles may be enameled with different materials and finishes. Other objects and advantages will appear as the description proceeds.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In the treatment of complex glass articles, such as for instance articles formed of glass tubing, as in the luminous tubing constituting neon signs and the like, for opaquing out the cross-overs or portions which are not to show, it has been the practice to merely apply a black paint. Similarly, where attempts have been made to color such prepared tubes, paint of the desired color has been applied. Such material is altogether lacking in durability and in a very short time the neon tube so treated is streaky and irregular, and light shows through at the cross-overs or portions which were supposed to be blacked out. The reason for the use of such fugitive material has been the fundamental limitation that the glass tubing itself is of very low melting point, and it has been considered as incapable of withstanding any treatment other than mere surface painting. I have now found however that by suitable treatment it is possible to apply to such material, a vitreous enamel which not only gives the durability heretofore lacking, but also results in novel visual effects. Articles thus of glass tubing shaped into any desired configuration, as for lights, signs, ornaments, etc., may thus be coated in selective portions or in whole, as desired. Such glass tubing is lead glass, and of low softening point, in order to allow of shaping into sign letters or other desired shapes. Any article similarly which is of fragile or low melting character may likewise be provided with vitreous enamel coating in whole or in parts. With a glass tubing unit such as for a neon sign, shaped into the letters and other portions which are to be visible, such visible portion being connected by crossovers or portions not to be visible, the cross-overs are coated with a vitreous enamel liquid composition which will provide opaquing or black. This may be brushed onto the portions concerned, or since the cross-overs are ordinarily bent back in a plane to the rear of the plane of the visual portions or sign letters, the application of the coating material to the cross-overs may be accomplished very conveniently by dipping the article into the composition sufficient to submerge merely the cross-overs or rear portions which are to be opaqued. The coating so applied is allowed to dry, and then the article is placed on an inert dust bed, with the coated portion exposed, while the uncoated portion or letters of the unit are bedded in the inert dust, being covered to the extent desired, and the whole is then exposed to furnace heat to fuse and complete the vitrifying reaction in the enamel coating. It will be observed that in this procedure the vulnerable glass tubing is for the most part protected in the inert dust bedding material and is uniformly supported and backed up thereby, while the exposed portion particularly requiring the heating is in position to receive the full effect thereof. Even if the temperature is such as to start softening of the glass body tubing the support is such as to prevent its collapsing or deformation, and furthermore with such manner of exposure the relatively cooler bed material can assist in carrying away heat such as to inherently safeguard the softenable tubing glass. With suitable materials and conditions the time of exposure in the heating zone may in fact also be so short as to additionally safeguard the tubing body. The fusible material or enameling composition is a ceramic composition, such as a boro-silicate, particularly including lead. The proportions and ingredients may vary somewhat, depending upon conditions, and the enamel may be produced in colors as desired, from white through the range of pastel or deeper colors to black, ceramic colors or oxides being incorporated, such as oxides of tin, zinc, lead, iron, copper, manganese, etc. And for instance the composition may be made up of borax 29.64 parts by weight, feldspar 30.78, fluorspar 3.0, cryolite 2.0, flint 28.22, sodium carbonate 2.33, and zinc oxide 5.0. Another illustrative formula is borax 38.2, feldspar 28.2, quartz 20.3, soda ash 10.2, and cryolite 2.2. Another is borax 34.4, boric acid 4.3, feldspar 34.6, quartz 19.1, aluminum oxide 3.2, and fluorspar 3.5. Another for instance is borax 34.9, feldspar 28.6, quartz 12.0, soda ash 5.3, niter cake 13.2, aluminum oxide 2.6, and sodium silico-fluoride 3.0. Likewise, another is borax 32.0, feldspar 33.2, fluorspar 2.12, cryolite 2.12, flint 30.5, and tin oxide 7.0. Advantageously also, lead may be included in considerable amount, to correspond in fact to the lead content of the glass. Lead oxide or red lead, may thus be desirably included, and the formula may conveniently be for instance borax 6.9, feldspar 3.9, quartz 20.7, red lead 55.3, and fluorspar 9.1. Small amounts of boric acid and barium carbonate may also be included. These detailed compositions illustrate coating materials which may be employed. The mineral constituents may be ground in any suitable apparatus, such as ball mills or other as desired, along with water as liquid vehicle, and a suspending agent such as Vallender clay or other clay slip, or a gum such as gum arabic where the coating is to be applied more especially by brushing. Advantageously, part of the water may be substituted by alcohol or turpentine and alcohol. The amount of liquid vehicle may vary somewhat, the proportioning being such as to porvide a liquid composition which can be applied by dipping, spraying, brushing, to lay on evenly and not become unduly displaced by handling subsequently. The liquid vehicle is required at the rate of about three quarts per each pound of the dry ingredients.

The raw vitreous composition, as a liquid, having been applied to the articles to be coated, as indicated, the coating is allowed to set for a sufficient time to permit convenient subsequent handling. Such drying occurs in a few minutes in the air. The coated article is then subjected to heat to complete the reactions in the coating. Furnace temperature may be 800–1400° F., depending upon the particular ingredients and time of exposure. In general, the lower the temperature the longer the time requirement. Temperatures around 1000–1050° F. are particularly convenient and the enamel material coating so treated can be fused to a uniform shiny finish in about four minutes. If an egg shell finish is desired, this may be obtained in two to three minutes. The high temperature range mentioned is effective for very short exposures, such as on the order of a minute and a half, or flash exposure. With the composition material containing lead, particularly, the advantageous result is obtained that the coating has substantially the same coefficient of expansion and contraction as the glass upon which it is applied; and thus the coating may be carried on to the electrode-ends of neon tubes without detriment, and it does not need to be wiped off before sealing in the electrodes. Supporting and exposing the coated articles as pointed out foregoing may be particularly conveniently accomplished by pans or trays of sufficient size to accommodate the articles to be treated, and containing the inert dust supporting bed as indicated. The material for this may conveniently be plaster of Paris powder, hydrated or unhydrated, ground asbestos, talc, mica, finely divided quartz or silica, or other inert divided material capable of being moved in position in accordance with the support-requirements of complicated shaped articles to be treated. The depth of the bed of inert pulverulent material will depend upon the particular article being treated, and may be several inches or more. The pans are arranged to be inserted into and withdrawn from the heating furnace, which may be fired with any fuel as desired, either gas, oil, coal, etc., and I particularly employ a construction in which the pans are forwarded by a carrier. While this may be in various forms, I prefer an endless chain conveyor passing through the furnace in one part of its circuit, and carrying the pans at regulated speed from a charging station, through the furnace, and to a discharging station, and then to the charging station and so on. The temperature maintained in the furnace or heating zone, being as above pointed out, the rate of travel of the conveyor may thus be correlated as desired, by electric motor drive control or variable interposed gearing. And, in operation the neon tubing shapes or other articles to be enamel coated are subjected to the coating application of the raw material, on such portions as desired, and the pans being filled with the pulverulent bedding material, the coated articles are set therein with the coated portions exposed, while the uncoated portions are more or less bedded down into the inert dust. This procedure particularly well lends itself to selective coating, and in instances where merely the cross-overs or connections of neon tubes or the like are to be coated or opaqued, such portions, usually in a plane to the rear of the visual portions, are selectively coated and are exposed to the furnace heat as supported on the inert dust material as indicated. For thus coating articles my complete device may involve an endless chain conveyor having hooks or carrying means by which the articles to be enameled may be picked up, or be placed on the carrier by an operator as desired, and be carried to and into a tank of the enameling liquid at constant level and be dipped to the proper depth and then be carried through a drying expanse, which where preferred may be enclosed as a chamber and by being over or alongside the heating oven may receive sufficient waste heat therefrom as desired, and then the conveyor deposits the coated articles or they may be taken off by an operator and be inverted on the trays of supporting dust and on the heater conveyor be carried through the heater oven and then to point of removal by operator and re-charging of the trays in succession with coated articles to go through the oven and so on. Successive coatings on different portions, or on the same portions may be applied. The article may be for instance a neon tube sign unit in which it is desired to provide a differential visual effect, and I have found that with vitreous compositions in accordance with this invention the luminescence of the tube shows through the vitreous coating with a highly improved subdued effect, the annoying glare common in neon tubes being hereby eliminated. The coating may be plain white or of other colors as desired, and for instance such a tube unit may be coated on its cross-over or rear portion with a black composition and be supported on the pulverulent support material with the uncoated portion of the tubing more or less bedded in the pulverulent material, and thus be passed through the furnace to be fused, whereupon it is subjected to the application of coating material for the letters or visual portion of the unit, and is again placed on the supporting pulverulent material, this time with the first-coated portion down and the newly-coated portion in exposure, and it is passed through the heating zone or furnace for the fusing of the second coating.

Other modes of applying the principle of the invention may be employed, change being made as regards the details described, provided the features stated in any of the following claims, or the equivalent of such, be employed.

I therefore particularly point and out and distinctly claim as my invention:

1. A process of vitreous enamel coating, which comprises subjecting glass tubing of desired configuration having portions in two planes, front and rear, to coating on the front portion with a liquid suspension of fusible mineral matter, drying such coating, placing the coated tubing on a bed of plaster of Paris powder with the coated portion exposed, subjecting the exposed surfaces to furnace heat, sufficient to fuse said coating, removing the coated tubing, coating the rear portion with a liquid suspension of fusible mineral matter for opaquing obscuration, drying the coating, placing the coated article on a bed of plaster of Paris powder with the first coated portions buried and the last coated portions exposed, and subjecting the exposed portions to furnace heat sufficient to fuse said coating.

2. A process of vitreous enamel coating, which comprises subjecting glass tubing of desired configuration having portions in two planes, front and rear, to coating on the front portion with a liquid suspension of fusible mineral matter providing a desired color, drying such coating, placing the coated article on an inert pulverulent bed with the coated portion exposed, subjecting the exposed surface to furnace heat, sufficient to fuse said coating, removing the coated tubing, coating the rear portion with a liquid suspension of fusible mineral matter, drying the coating, placing the coated article on a bed of inert pulverulent material with the first coated portion buried and the last coated portion exposed, and subjecting the exposed portion to furnace heat sufficient to fuse said coating.

3. A process of vitreous enamel coating, which comprises subjecting glass tubing of desired configuration having portions in two planes, front and rear, to coating on one portion of a fusible coating, including vitreous enamel material, placing the coated article on a bed of inert pulverulent material with the coated portion exposed, passing the same through a heat zone sufficient to fuse said coating, subsequently applying fusible coating material, including vitreous enamel, to another portion of the article, placing the coated article on a bed of inert pulverulent material with the first coated portion down and the last coated portion exposed, and again passing the same through the heat zone sufficient to fuse said coating.

CARL R. RUSE.